United States Patent [19]

Yokota et al.

[11] Patent Number: 5,746,246

[45] Date of Patent: May 5, 1998

[54] WATER HAMMER PREVENTING CHECK VALVE

[75] Inventors: Hiroshi Yokota, 11-11-302, Midori 1-Chome, Minami-Ku; Shingo Yokota, 17-27, Midori 3-Chome, Minami-Ku, both of Hiroshima-Shi, Hiroshima-Ken, Japan

[73] Assignees: Kabushiki Kaisha Yokota Seisakusho; Hiroshi Yokota; Shingo Yokota, all of Hiroshima-Ken, Japan

[21] Appl. No.: 836,795

[22] PCT Filed: Dec. 1, 1995

[86] PCT No.: PCT/JP95/02463

§ 371 Date: May 16, 1997

§ 102(e) Date: May 16, 1997

[87] PCT Pub. No.: WO96/18054

PCT Pub. Date: Jun. 13, 1996

[30] Foreign Application Priority Data

Dec. 5, 1994 [JP] Japan ................... 6-300495
Jan. 18, 1995 [JP] Japan ................... 7-005398

[51] Int. Cl.$^6$ ........................... F16K 21/10
[52] U.S. Cl. ........................... 137/514; 137/527
[58] Field of Search .......... 137/527.4, 527, 137/514; 251/87, 84

[56] References Cited

U.S. PATENT DOCUMENTS

| 2,356,990 | 8/1944 | Getz | 137/527.4 |
|---|---|---|---|
| 3,106,220 | 10/1963 | Hose | 137/514 |
| 3,177,894 | 4/1965 | Camp | 137/527 |
| 3,817,278 | 6/1974 | Elliott | 137/527 |
| 3,883,111 | 5/1975 | Jourdan | 251/82 |
| 3,942,551 | 3/1976 | Schuller et al. | 137/514 |
| 4,188,973 | 2/1980 | Weise et al. | 137/527.4 |
| 4,353,390 | 10/1982 | Karpenko | 251/82 |
| 4,669,500 | 6/1987 | Strelow | 137/527 |
| 5,010,919 | 4/1991 | Partridge | 137/527.4 |

FOREIGN PATENT DOCUMENTS

986860  3/1965  United Kingdom .......... 137/514

Primary Examiner—Denise L. Ferensic
Assistant Examiner—Joanne Y. Kim
Attorney, Agent, or Firm—Ladas & Parry

[57] ABSTRACT

A check valve for preventing water hammer in which a valve element is adapted for quick initiation of a valve closing motion without delay in response to an abrupt change in fluid flow resulting from stoppage of a pump, and which is seated on a valve seat when the inertial flow of the fluid in the discharge direction stops, without generating a water hammer and impulse noise. The valve element and the valve seat are constructed so that the valve element follows the motion of the flowing fluid and is interlocked with a braking device by a linear motion transmitting mechanism. The linear motion transmitting mechanism and the braking device are constructed to remove the effect of braking actions that decelerate the valve closing motion of the valve element and of frictional resistance in the period between when the valve element starts a valve closing motion and when the valve element is almost seated on the valve seat, and then to brake the valve element gently only until the valve element is seated on the valve seat. The timing of the seating of the valve element on the valve seat can be adjusted by a mechanism for adjusting the braking action starting position, by a bypass adjusting valve combined with the braking device or by a mechanism for adjusting biasing force applied to the valve element.

4 Claims, 6 Drawing Sheets

PRIOR ART

F I G. 6
PRIOR ART

WATER HAMMER PREVENTING CHECK VALVE

TECHNICAL FIELD

The present invention relates to a water hammer preventing check valve to be placed in a fluid conveying pipe, capable of safely and reliably preventing water hammer in a pipeline caused by a reverse flow of the fluid when a pump is stopped suddenly. In this specification, the term, "water" is used as a general term signifying a fluid, and terms "upstream side", "downstream side", "inlet" and "outlet" are used to designate positions and directions with reference to the normal direction (not the reverse direction) of flow of the fluid.

BACKGROUND ART

If the operation of a check valve placed in a water supply pipe is unable to follow an abrupt change in the flowing velocity of water flowing through the water supply pipe resulting from the stoppage of a pump and if the valve element of the check valve is seated on the valve seat of the same during the reverse flow of water, water hammer is created on the downstream side of the check valve, which, in some cases, causes serious troubles. Inventions relating to check valves having water hammer preventing capability are disclosed in, for example, JP-B No. 40-3654, (Water Hammer Preventing Pumping Apparatus), JP-B No. 51-25930 (Improvements in Water Hammer Preventing Pumping Apparatus) and JP-B No. 63-60274 (Swing Type Water Hammer Preventing Check Valve). These inventions will be referred to as "prior inventions". As is known, those inventions have prevalently been put to practical use. The present invention relates to improvements in the water hammer preventing check valves of the prior inventions.

The water hammer preventing check valves of the prior inventions are based on technical ideas technically superior to conventional technical ideas of preventing water hammer which have been prevalent symptomatic water hammer preventing ideas allowing a valve element to be seated on a valve seat during the reverse flow of a fluid and retarding the movement of the valve element by a braking means to ease shocks, using an automatic valve or a surge tank to relieve and cushion pressure rise resulting from water hammer. It can readily be gathered from descriptions in the specifications of the prior inventions that the technical concepts on which the prior invention are based include radical improvements intended to stop a reverse flow in a pipe for the positive elimination of causes of water hammer by forming a valve element and flow passages around the valve element so that the valve element is about to be seated on a valve seat at a moment when the inertial flow of a fluid in a discharging direction in the pipe stops after the pump has been stopped.

Figure 5:
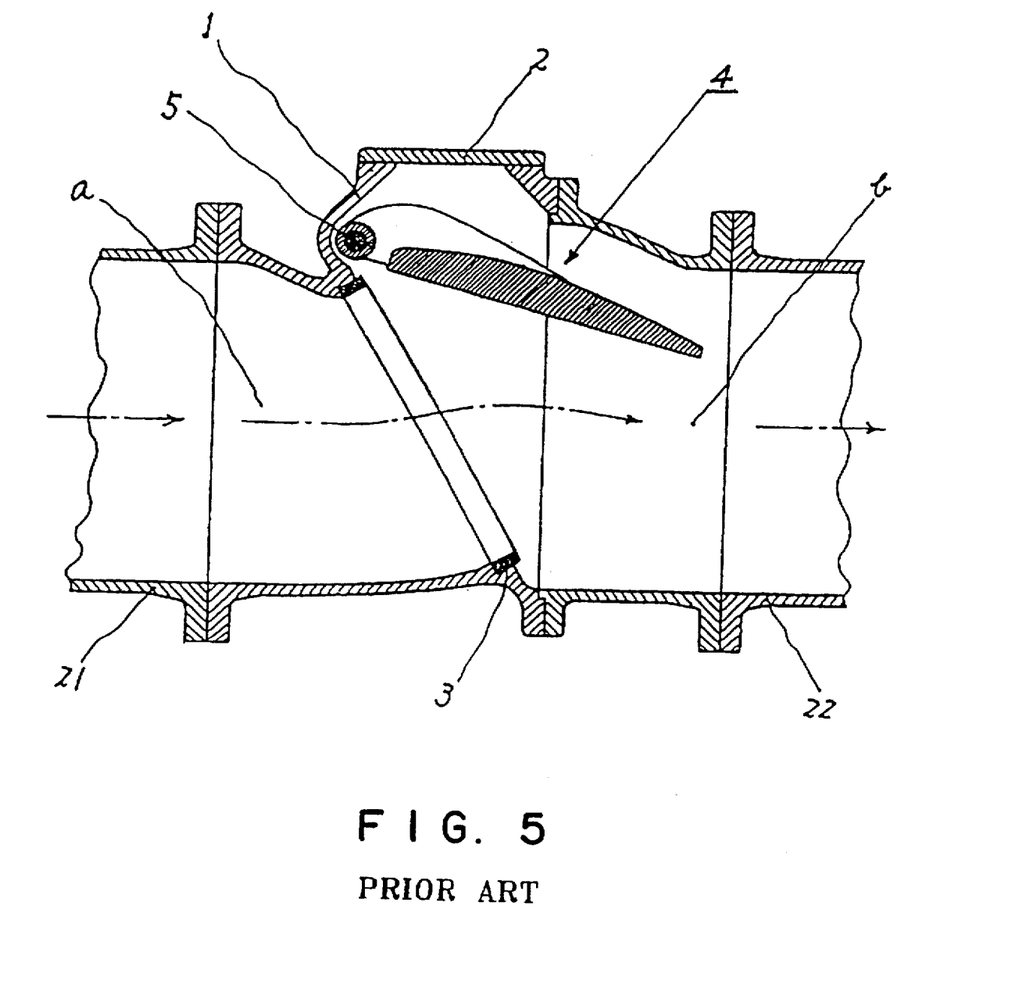
FIG. 5 is a longitudinal sectional view of a prior art (prior invention) water hammer preventing check valve.

As shown by way of example in FIG. 5, a water hammer preventing check valve of the prior invention is constructed so as to eliminate as many factors obstructing the closing motion of a valve element as possible; that is, a valve element is designed so that the valve element has a reduced mass, the least possible form drag and the least possible inertial resistance. This valve element is capable of appropriate closing motion by its own weight following the reduction of flow velocity without delay, the closing motion of the valve element is corrected by biasing the valve element in the closing direction by a weight or a spring if there is any error in the closing motion of the valve element, and the valve element achieves water hammer prevention almost satisfactorily. However, when putting this water hammer preventing check valve of the prior invention to practical use, the water hammer preventing check valve is still encountered by the following technical problems.

(A) When supplying water into a pressure tank installed near a pump or when one of a plurality of pumps installed close to each other is stopped abruptly while the plurality of pumps are in parallel operation, the potential force of the inertial flow of water column in a pipe downstream of the pump is relatively small because the pipe downstream of the pump is short, whereas the pressure in the pressure tank or the discharge pressures of the adjacent pumps in parallel operation act as a great force that causes the reverse flow of the water column and, in some cases, advances remarkably the time when the flow reverses. The form drag, the mass and the inertial resistance of the water hammer preventing check valve of the prior invention are still excessively large to deal with such a rapid change of flow and, in some cases, the closing motion of the valve element is unable to follow the rapid deceleration of the flow.

(B) If an attempt is made to enhance the ability of the valve element to follow the deceleration of the flow simply by increasing the valve element closing force, the resistance of the valve element against the flow increases adversely during the operation of the pump with the valve element at a fully open position, and the inertial flow of the discharged fluid is restricted to increase negative pressure in the pipe downstream of the check valve when the pump is stopped. It is difficult to calculate an accurate valve element closing force for a check valve placed in a water supply pipe in which the flow of water is unstable. Therefore, it is a usual practice to adjust the valve element biasing force of a valve element biasing means by a trial-and-error method and to incorporate the valve element biasing means into the check valve by gauging at site. Such a method of using the valve element biasing means is inconvenient and, if factors defining the condition of the water supply pipe change, the timing of seating the valve element on the valve seat changes. Consequently, some reverse flow occurs to cause water hammer.

(C) Even if the problems stated in (A) and (B) are solved through the repetition of the trial-and-error method and gauging, it is a natural result that some impulsive sound is generated when a valve element, i.e., a moving object, is seated on a valve seat, i.e., a stationary object. Even if the impulsive sound is not a water hammering sound but a valve closing sound, the impulsive sound could be an offensive sound when the level of the impulsive sound exceeds a certain threshold level.

(D) If an attempt is made to ease the shock of collision of the valve element against the valve seat simply by connecting a generally known dashpot to the valve element, the dashpot will apply a braking force to the valve element which needs to respond quickly to the deceleration of the flow and to close following the deceleration of the flow, which may possibly nullify the intended advantages of the water hammer preventing check valve of the prior invention. In a previously proposed check valve provided with a dashpot, the braking force of the dashpot varies stepwise so that the dashpot applies a low braking force to the valve element of the check valve at the initial stage of the closing motion of the valve element so that the valve element is able to move quickly in the initial stage of the closing motion. However, the dashpot cannot be a drastic means for solving the problem because the dashpot is nothing else but a braking device, the frictional resistances of the associated operating members and sealing members act as braking forces, and the occurrence of water hammer is dependent on the delicate change of valve closing timing. If a valve shaft supporting the valve element is interlocked with a dashpot by a linkage, a large force including a torsional moment is concentrated around the valve shaft. Therefore, various conditions must be taken into consideration to reinforce the valve shaft and the associated parts when designing the valve shaft and the associated parts and, consequently, an enlarged, large-scale, complicated peripheral device is necessary.

Figure 6:
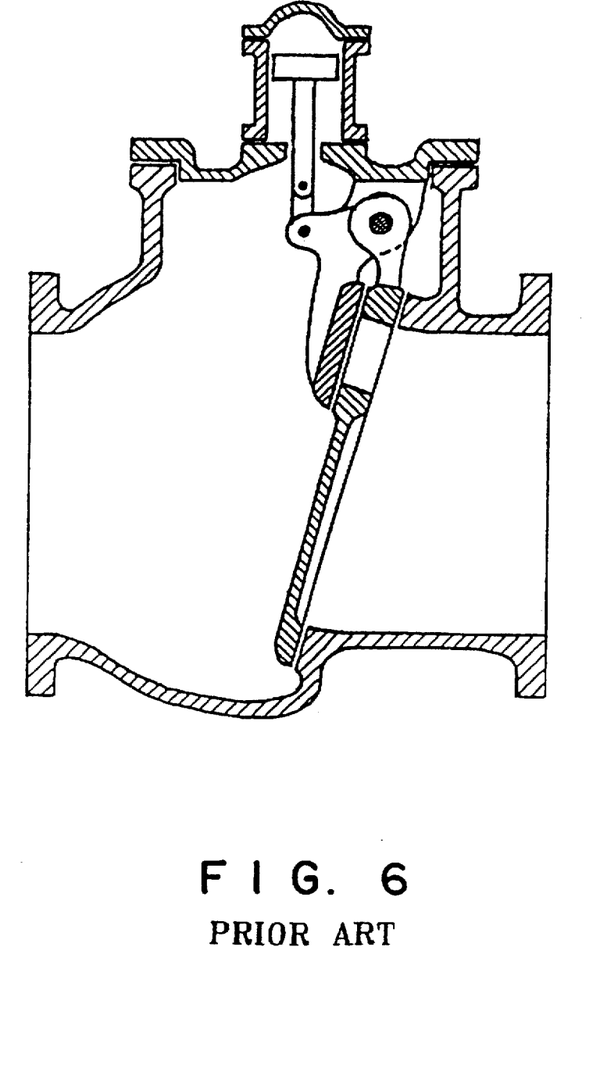
FIG. 6 is a longitudinal sectional view of a prior art check valve.

FIG. 6 shows a method of using a dashpot in combination with a valve element, proposed in JP-U No. 28-12077. This method is based on a symptomatic technical idea which admits reverse flow and eases impulse gradually. This method inevitably needs a biplane valve element including a main valve element and an auxiliary valve element which operate in two steps to withstand a strong reverse flow. Such a technical idea differs from the simple technical idea of preventing water hammer of the prior invention and requires a complicated, expensive device.

The foregoing problems mentioned in (A), (B), (C) and (D) above are caused by the combination of intricate conditions and, as a matter of fact, it has been considered that those problems cannot easily be solved and could not have been solved even by the water hammer preventing check valves of the prior inventions. The present invention is intended to solve drastically all those technical problems which have not been solved and to provide an economically highly advantageous water hammer preventing check valve capable of properly compensating for a time lag in valve closing timing and of securing an optimum action of its valve element, having a compact, rational construction, and capable of being easily designed and manufactured.

DISCLOSURE OF THE INVENTION

With the foregoing object in view, the present invention constructs a braking structure capable of moderately braking a valve element only in a short period between a moment when the valve element is almost seated on a valve seat and a moment when the valve element is seated on the valve seat, making good use of the inherent advantages of the water hammer preventing check valves of the prior inventions, uses a mechanism which simply enables various adjustments for adjusting valve closing timing, and exercises an epoch-making effect.

Figure 1:
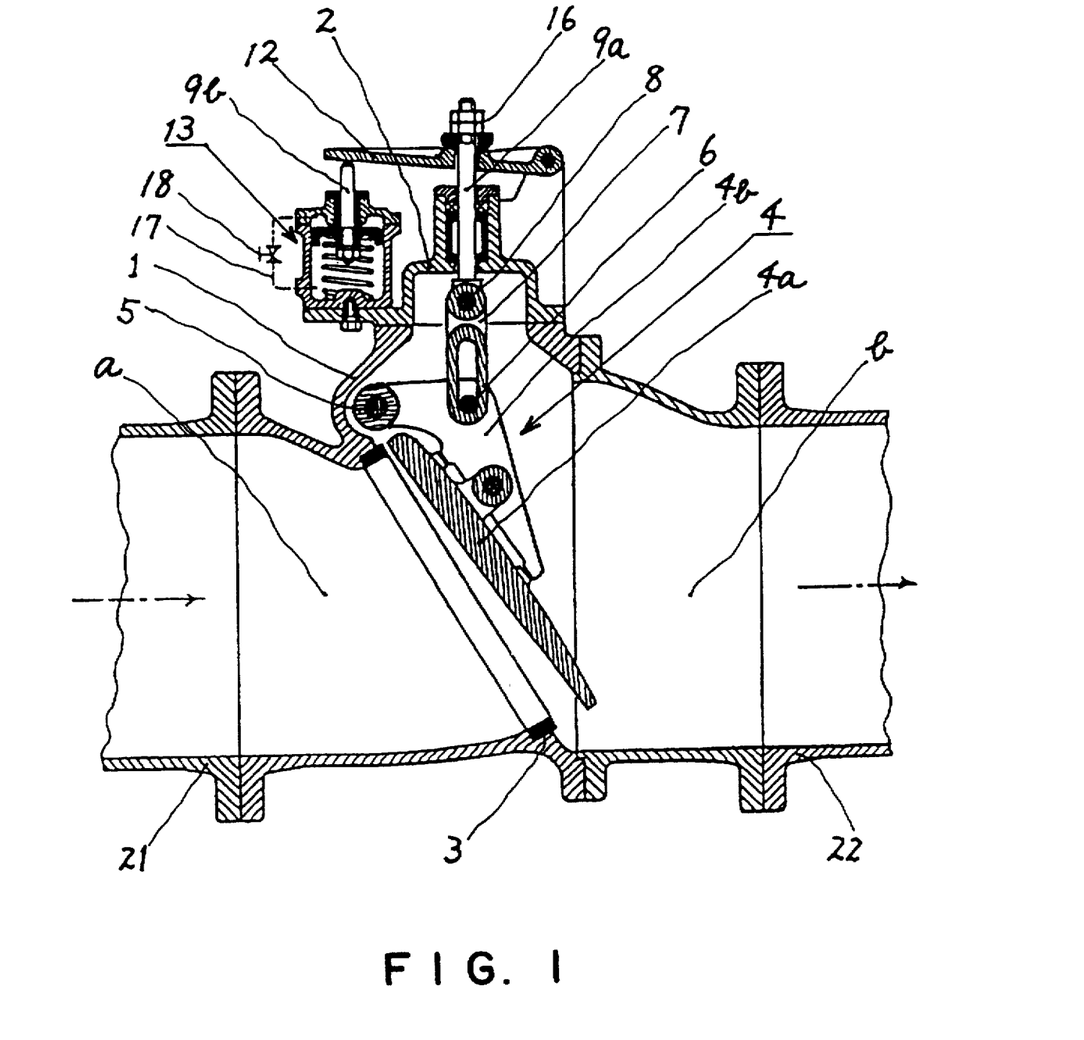
FIG. 1 is a longitudinal sectional view of a preferred embodiment according to the present invention in a braking starting state.

An invention of claim 1 will be described with reference to FIG. 1 showing a water hammer preventing check valve according to the present invention.

A valve casing 1 of a water hammer preventing check valve is placed between an inlet pipe 21 and an outlet pipe 22 at an appropriate position on the discharge side of a conveying pump, not shown, and forms an inlet passage a and an outlet passage b. A valve element 4 placed in the valve casing 1 is supported for swing motion on the valve casing 1 by a shaft 5 on the outlet side of a valve seat 3 downwardly inclined in a direction from the passage a toward the passage b.

The valve element 4 is formed in a shape which does not exert a high resistance against the flow and in the smallest possible inertial mass to enhance the ability of the valve element 4 to follow the variation of the flow. The valve element 4 is thus formed in the shape and thus supported so that its center of gravity is at the downstream side of the shaft 5 with respect to the direction of the flow and its weight acts as a valve closing force. The valve element 4 is designed so that the magnitude of the valve closing force can be balanced by a force applied to the valve element 4 in a valve opening direction, i.e., a valve opening force, by the flow of a predetermined maximum flow rate when the check valve is fully open.

A connecting member 6 attached to the back (downstream side) of the valve element 4 is linked to a connecting member 8 attached to a connecting rod 9a by a linking member 7 to form a linking mechanism. This linking mechanism is so designed as to not transmit any motion when the valve element 4 is in a moving range other than a limited moving range between a position where the valve element 4 is almost seated on the valve seat 3 and a position where the valve element 4 is actually seated on the valve seat 3. Therefore, the valve element 4 is able to move freely without being obstructed by any braking action and any frictional resistance at all during a closing motion in the moving range before the position where the valve element 4 is almost seated on the valve seat 3. The connecting rod 9a, a lever 12 and a connecting rod 9b form a linear transmission mechanism. The connecting rod 9a is connected through the lever 12 and the connecting rod 9b to a braking device 13 installed on an upper part of the valve casing 1. The position of the connecting member 6 on the valve element 4 is determined so that the connecting member 6 approaches the axis of the connecting rod 9a as close as possible while the valve element 4 is moving from the position where the valve element 4 is almost seated on the valve seat 3 and to the position where the valve element 4 is actually seated on the valve seat 3.

The braking device 13 is of a generally known type comprising, as principal components, a cylinder having a closed chamber, a piston mounted on the connecting rod 9b inserted through a sealing member into the cylinder, and a return spring for returning the piston to its initial position. Spaces between the cylinder and the piston are filled up with a fluid, such as an oil or water. A braking force is created by the resistance against the flow of the fluid from one chamber on one side of the piston into the other chamber on the other side of the piston through a gap between the cylinder and the piston as the piston moves. The connecting rod 9a is provided with a braking action starting position adjusting mechanism 16 to adjust braking action starting timing. A bypass circuit 17 including a bypass adjusting valve 18 is connected to the braking device 13 to adjust the intensity of the braking action.

Figure 2:
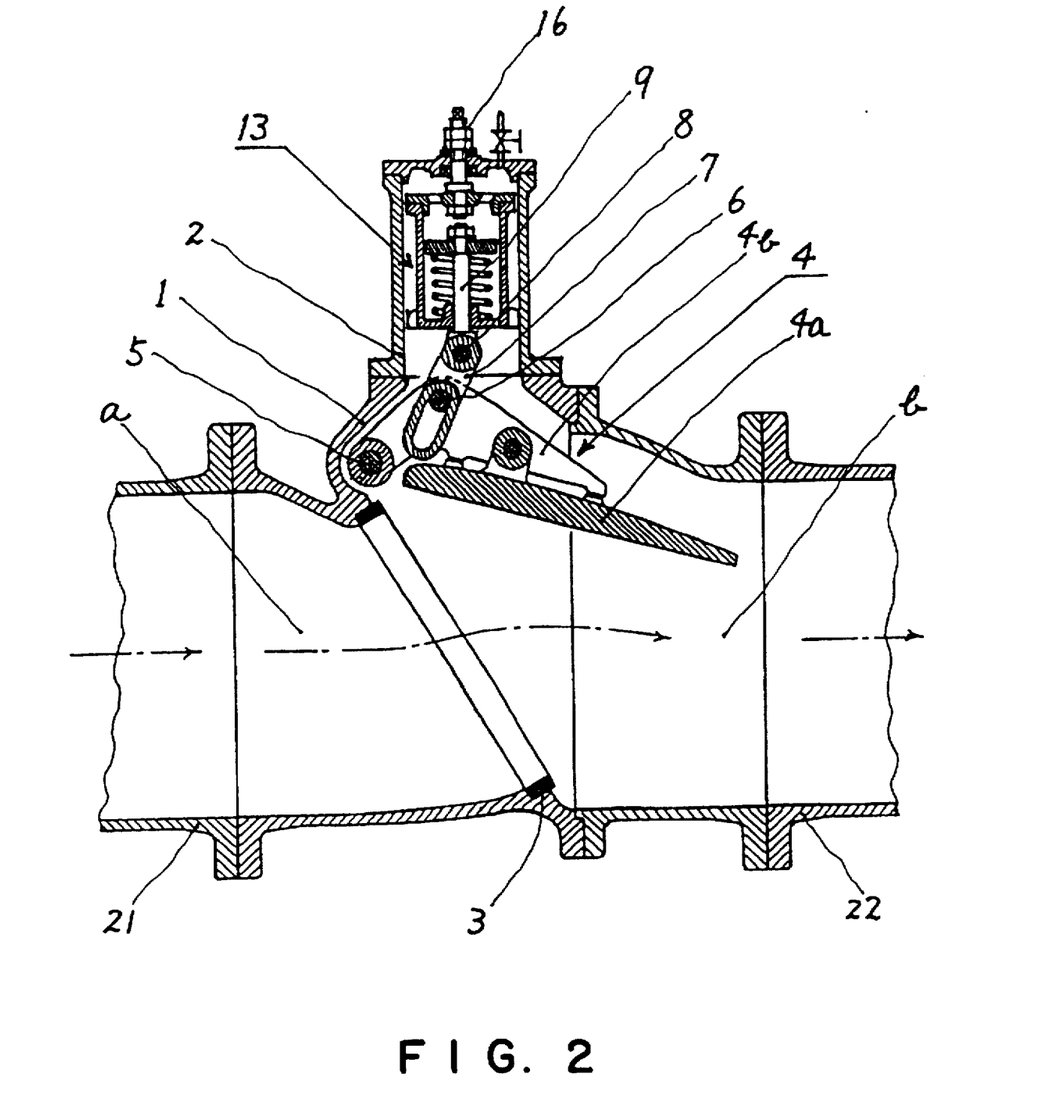
FIG. 2 is a longitudinal sectional view of another embodiment according to the present invention in a nearly fully open state.

A water hammer preventing check valve shown in FIG. 2 has a more compact construction provided with a braking device 13 in a valve casing 1. In this water hammer preventing check valve, a through hole is formed in the cylinder of the braking device 13 at an appropriate position to use the fluid flowing from the passage a to the passage b as a working fluid. The water hammer preventing check valve shown in FIG. 2 is similar in other respects to the water hammer preventing check valve shown in FIG. 1 and hence further description thereof will be omitted.

Figure 3:
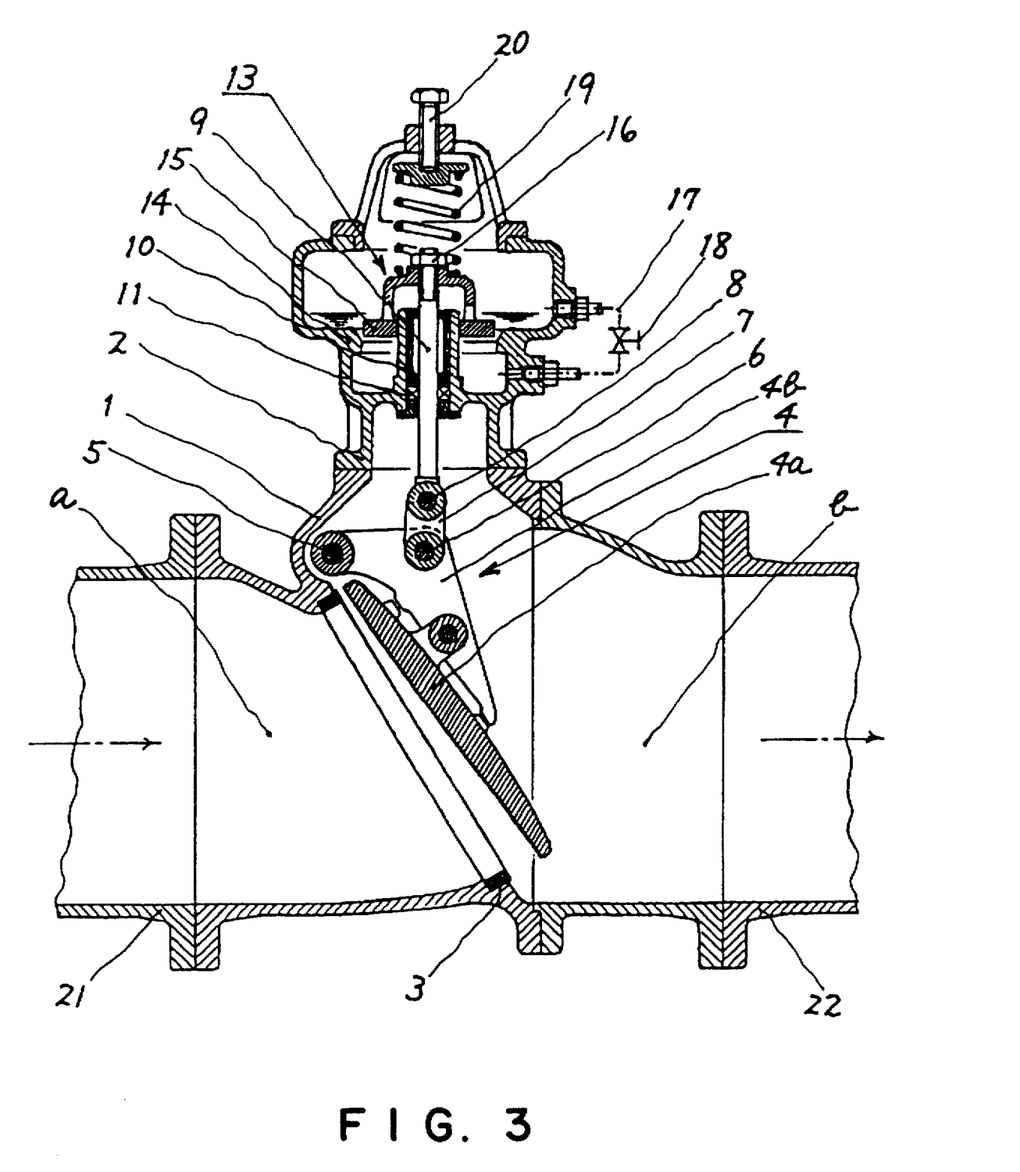
FIG. 3 is a longitudinal sectional view of a third embodiment according to the present invention in a braking starting state.

An invention of claim 2 will be described With reference to FIG. 3 showing a water hammer preventing check valve according to the present invention.

A valve element 4, a valve seat 3 and the configuration of the passage around the valve element 4 and the valve seat 3 in the water hammer preventing check valve shown in FIG. 3 are the same as those of the water hammer preventing check valves shown in FIGS. 1 and 2. The configurations of a braking device 13 and a motion transmitting mechanism interlocking the valve element 4 and the braking device 13 of the water hammer preventing check valve shown in FIG. 3 are different from those of the check valves shown in FIGS. 1 and 2. In this embodiment, the valve element 4 is connected to the braking device 13 by a direct connecting mechanism not including any lost motion mechanism like that included in the foregoing linking mechanism. Therefore, the water hammer preventing check valve is provided with a means for completely removing or nullifying braking resistance and the frictional resistances of moving members and sealing members, which act against the closing motion of the valve element 4 during the closing motion of the valve element in a range before a position where the valve element 4 is almost seated on the valve seat 3.

In the braking device 13, a piston 15 is exposed to the outside, i.e., the atmosphere, through a window formed in a cylinder 14 so that the piston 15 does not undergo any resistance of the fluid while the piston 15 is in a range of stroke corresponding to a range of closing motion before a position where the valve element 4 is almost seated on the valve seat 3, the level of the working fluid in the cylinder 14 is adjusted so that the working fluid may not obstruct the movement of the piston 15, and the valve element 4 is biased in a closing direction by a valve element biasing member 19 which exerts a biasing force exceeding the frictional resistances of the braking device 13 and the moving members and sealing members of the motion transmitting mechanism to nullify the foregoing frictional resistances.

Figure 4:
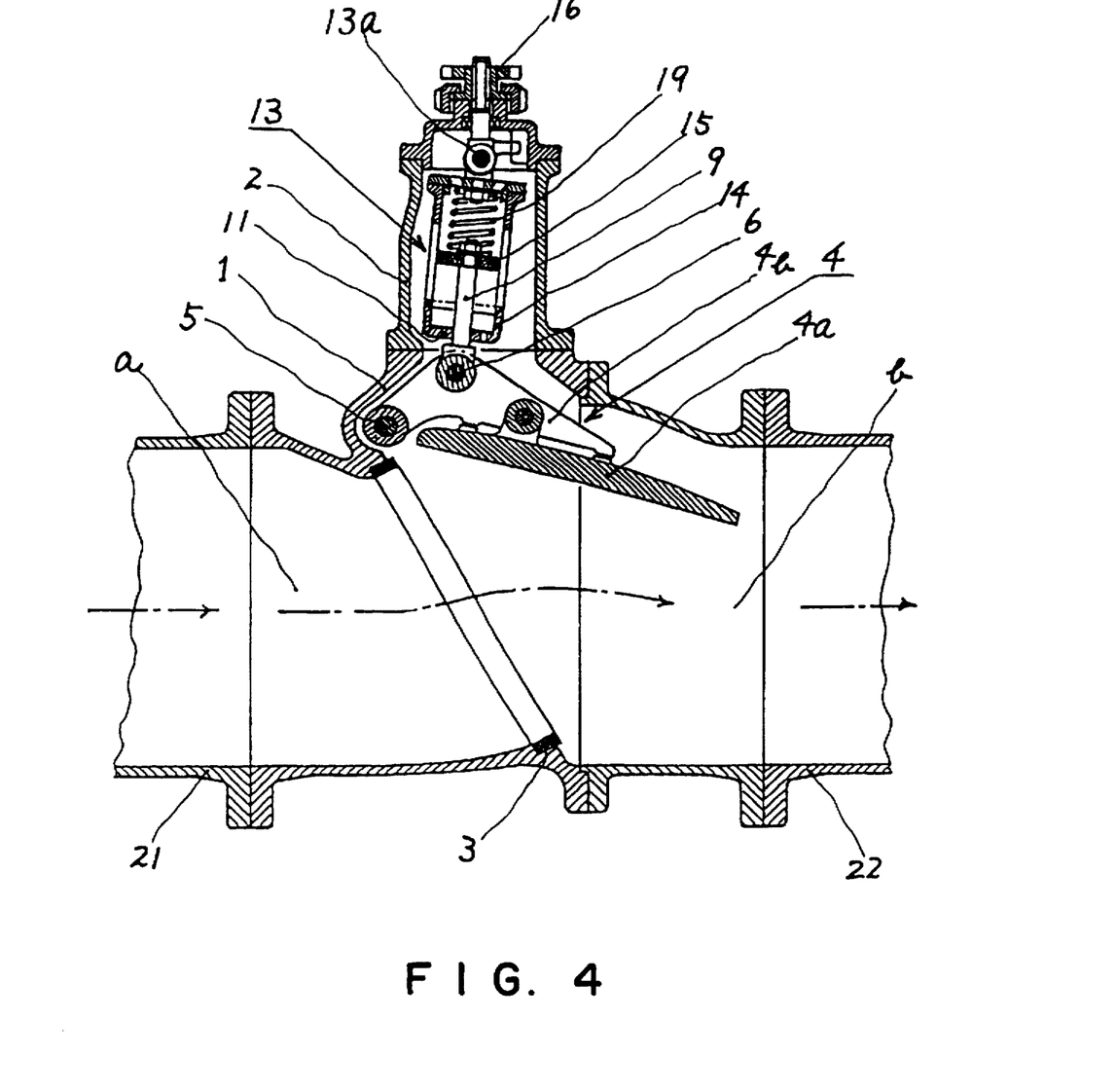
FIG. 4 is a longitudinal sectional view of a fourth embodiment according to the present invention in a nearly fully open state.

FIG. 4 shows a water hammer preventing check valve of a more compact construction provided with the braking device 13 and the valve element biasing member 19 in a valve casing 1. In this water hammer preventing check valve, a piston 15 is exposed to the outside, i.e., the interior of the valve casing 1, while the piston 15 is in a range of stroke corresponding to a range of closing motion of a valve element 4 before a position where the valve element 4 is almost seated on a valve seat 3. A fluid flowing from a passage a to a passage b is used as a working fluid for the braking device 13. The water hammer preventing check valve shown in FIG. 4 is the same in other respects as that shown in FIG. 3, and hence further description of the water hammer preventing check valve will be omitted.

The operation of the present invention will be described below.

While any one of the foregoing water hammer preventing check valves is being opened, a valve opening force and a valve closing force are balanced and the valve element 4 is held afloat in the fluid flowing through the water hammer preventing check valve. Therefore, the valve element 4 starts a valve closing motion substantially simultaneously with sudden start of deceleration of the flow. In a period between the start of the valve closing motion and a moment when the valve element 4 is almost seated on the valve seat 3, the braking effect of the braking device 13 and the frictional resistances of the moving members and the sealing members do not decelerate the closing motion of the valve element 4 at all.

After the valve element 4 has reached the position where the valve element 4 is almost seated on the valve seat 3, the braking effect of the braking device 13 become effective so that the valve element 4 is seated gently on the valve seat 3 without generating water hammer or impulsive sound. The timing of the start of the braking action of the braking device 13 and the intensity of the braking action can simply be adjusted by means of the braking action starting position adjusting mechanism 16 and the bypass adjusting valve 18, respectively.

According to the present invention, the braking device 13 is not connected to the shaft 5 supporting the valve element 4 and is connected to the valve element 4 substantially in the direction of the braking force. Therefore, any abnormal force, such as a torsional moment, is not exerted on any component members by the braking action, and hence the general construction of the water hammer preventing check valve is simple, especially in the region of the component parts associated with the shaft 5. The closing motion of the valve element 4 is braked gently after the valve element 4 has reached a position where the valve element 4 is almost seated on the valve seat 3, i.e., after the flow of the fluid in the discharge direction in the pipe has almost stopped so that the force of the inertial flow of the fluid has decreased substantially to naught and the fluid is about to flow in the reverse direction. Therefore, only a soft auxiliary braking action is needed to counterbalance a weak force applied to the valve element 4 by a reverse flow at the very initial stage of such reverse flow that may occur due to a small time lag in the closing motion of the valve element 4. This is fundamentally different from the principle of operation of the generally known conventional slow-acting check valve of a dashpot type in which a valve element moves in a closing direction against the strong pressure of a reverse flow. Therefore, the braking device 13 may be of a compact construction. Thus, the check valves of the present invention shown in FIGS. 1 to 4 solve economically and effectively all the aforesaid problems which have not been solved.

BEST MODE FOR CARRYING OUT THE INVENTION

In the water hammer preventing check valves of the present invention which exercise distinguished functions and effects as mentioned above, many structural changes may be made and conventional techniques may be used according to the gist of the invention to meet various practical requirements.

In the water hammer preventing check valves shown in FIGS. 1 to 4, the valve element 4 is able to move synchronously with deceleration of the flow in the pipe substantially without any time lag for a valve closing operation by its own weight as the factors obstructing the valve closing motion are reduced to the least possible extent, i.e., as the valve element 4 is formed in a theoretically reasonable shape and in a reduced mass to reduce the form drag and the inertial resistance to the least possible extent. Under a severe operating condition, such as an operating condition in which the fluid starts flowing in the reverse direction in a very short time, a valve element biasing member, such as a weight or a spring, not shown, may be interposed between the valve casing 1 and the valve element 4 to bias the valve element 4 in the valve closing direction to adjust the valve closing force optionally. The positional relation between the point of action of the valve element biasing member on the valve element 4, and the supporting point where the valve element biasing member is supported can be adjusted properly so that the least necessary valve closing force will act on the valve element 4 to reduce valve resistance loss when the valve element 4 is in the vicinity of the fully open position, and the maximum necessary valve closing force will act on the valve element 4 when the valve element 4 is in the vicinity of the fully closed position for a further desirable valve closing motion. Although the valve element biasing members 19 of the embodiments shown in FIGS. 3 and 4 are used for balancing the frictional resistances of the moving members and the sealing members as mentioned above, naturally, the valve element biasing members 19 may be used also for optionally adjusting the magnitude of the valve closing force. In FIG. 3, the valve element biasing force of the valve element biasing member 19 can easily be adjusted by a biasing force adjusting mechanism 20.

The valve seat 3, whose configuration is an important factor for closing the check valve without causing water hammer, is disposed in an inclined position relative to the passages a and b. The inclination of the valve seat 3 may be determined according to the purpose of the check valve. When the check valve is used under a general condition and in either a vertical position or a horizontal position, the desirable inclination, i.e., an angle to a plane perpendicular to the main streamline in the passages a and b, of the valve seat 3 is in the range of 20° to 30° to enable the check valve to be used for general purposes. However, the inclination of the valve seat 3 is not limited to those in the foregoing range.

The braking device 13 may be formed in any one of various suitable constructions. For example, the braking device 13 of the water hammer preventing check valve shown in FIG. 1 is of a well-known piston-and-cylinder type. In this embodiment, the braking device 13 is not limited to the piston-and-cylinder type and may be of any type, provided that the braking device 13 is capable of exercising an instantaneous braking effect. The braking device 13 of the water hammer preventing check valve shown in FIG. 2 has the cylinder provided with the through hole, and uses the fluid flowing through the passages a and b as a working fluid. However, the braking device 13 may be provided with a sealed cylinder and may use a working fluid other than the fluid flowing through the passages a and b. The braking device 13 of the water hammer preventing check valve shown in FIG. 3 has a cylinder 14 having an annular space, and an annular piston 15, and the working fluid contained in the braking device 13 for being pressurized at high pressure when the braking device 13 functions for braking, is not related directly to a sealing member 11 on a rod support 10. Therefore, sealing effect required of the sealing member 11 is eased, while leakage of the working fluid therethrough is effectively prevented, which is very advantageous for conditions for the manufacture of the water hammer preventing check valve. If a neck is formed in the cylinder 14 as shown in FIG. 3, the braking action of the braking device 13 can be made effective at a moment when the valve element 4 is almost seated on the valve seat 3, and the braking force is reduced at a moment when the valve element 4 is seated on the valve seat 3, whereby the chattering of the valve element 4 liable to be caused by the high-velocity flow when the valve element 4 is seated on the valve seat 3 can be avoided. The braking device 13 may be disposed outside the valve casing and the connecting rod 9 may be composed of the connecting rods 9a and 9b as shown in FIGS. 1 and 3 by way of example, to facilitate work for maintenance and inspection, or the braking device 13 may be built in the valve casing 1 as shown in FIGS. 2 and 4 by way of example to form the water hammer preventing check valve in a compact construction.

The motion transmitting mechanism interlocking the valve element 4 with the braking device 13 may employ the lever 12 as shown in FIG. 1 or the braking device 13 may be supported for swing motion on a pivot shaft 13a as shown in FIG. 4 and the linking member 7 may be omitted. Although the linking mechanism shown in FIGS. 1 and 2 employs the linking member 7 provided with a slot, a linking mechanism of other system may be used. It is desirable that the connecting member 6 for connecting the valve element 4 to the motion transmitting mechanism for interlocking the valve element 4 be disposed at a position on the discharge side of the valve element 4 as shown in FIGS. 1 to 4 and that a pulling force be applied to an intermediate portion of the valve element 4 for braking to distribute the braking force evenly to the entire surface of the valve element 4. It is desirable, from a viewpoint of preventing clogging with foreign matter and of facilitating work for maintenance and inspection, to dispose the braking device 13 near a bonnet 2 (on an upper portion of the valve casing 1).

In any one of the water hammer preventing check valves shown in FIGS. 1 to 4, the timing of the start of the braking action can easily be achieved by means of the braking action starting position adjusting mechanism 16. An opening of the valve element 4, i.e., a position of the valve element 4 relative to the valve seat 3, at which a braking action is to be started, is dependent on the conditions of installation and the purpose of the water hammer preventing check valve, and the elongations of the moving members must be taken into consideration in determining conditions for starting a braking action. Under general conditions, it is desirable to start a braking action upon the arrival of the valve element 4 at a position where the valve element 4 is inclined at an angle in the range of 2° to 5° to a plane including the surface of the valve seat 3. However, the angle at which the valve element 4 is inclined to the plane including the surface of the valve seat 3 when a braking action is started, is not limited to angles in the foregoing range. The adjustment of the braking force of the braking device 13 may be achieved by a method other than the method which operates the bypass adjusting valve 18 shown in FIGS. 1 and 3, and other than the method which uses the small adjusting hole formed in the cylinder shown in FIGS. 2 and 4. The braking force may be adjusted by replacing the piston with a piston of an appropriate diameter or the braking force of the braking devices 13 shown in FIGS. 1 and 3 may be adjusted by replacing the working fluid with a working fluid having an appropriate viscosity. It is possible to deal with the variation of valve element seating timing under special operating conditions, for example, when the mode of water supply is unstable and a fixed valve closing force is unable to deal with the unstable mode of water supply, by the adjustment of the braking force by the foregoing method.

The valve element 4 may be of any one of various prior art constructions. Each of the valve elements 4 shown in FIGS. 1 to 4 consists of a valve body 4a and a support arm 4b joined together by a joint having a small play, so that the valve element 4 can be manufactured by a simple manufacturing means and can closely be seated on the valve seat 3. A valve element 4 for a small water hammer preventing check valve or a valve element 4 which can be formed by precision machining so as to be closely seated on the valve seat 3 may be of a unitary construction.

Naturally, the technical concept of the present invention is applicable to check valves other than those of a swing type, such as check valves of a lift type, and the check valve of the present invention may be used in combination with the water hammer preventing check valve of the prior invention. For example, the check valve of the present invention may be used as a bypass valve in a fluid supply system employing the water hammer preventing check valve of the prior invention as a main valve. Various changes in the design of the check valve may be made within the scope of the present invention, and the present invention is not limited in its practical application to the foregoing embodiments of the present invention.

INDUSTRIAL APPLICABILITY

As is apparent from the foregoing description, according to the present invention, the monoplane valve element and the valve seat are formed so that the valve element is able to follow the motion of the flowing fluid easily, and the valve element is interlocked with the braking device by a linear motion transmitting mechanism. Further, the braking device and the motion transmitting mechanism are constructed so as to remove entirely the braking effect which decelerate the valve closing motion of the valve element, and to remove the frictional resistances of the moving members and the sealing members in a period between the start of the valve closing motion and a moment when the valve element is almost seated on the valve seat so that the valve element is braked gently only in a short period between a moment when the valve element is almost seated on the valve seat and a moment when the valve element is seated on the valve seat. Thus, the present invention solves the problems in the prior art water hammer preventing check valves which have not been solved, and provides, through the exploitation of simple, economical technical means, an epoch-making water hammer preventing check valve of a simple construction, capable of limiting valve resistance loss to a low level while the fluid is flowing at the predetermined maximum flow rate, capable of carrying out a valve closing operation without delay in quick response to a sudden change in the flow, and capable of making its valve element to be seated gently on the valve seat to prevent the generation of water hammer and impulsive noise. Although the water hammer preventing check valve of the present invention is provided with a monoplane valve element, the water hammer preventing check valve can be formed in a large size and can be used in combination with the compact braking device in a pipe of a large diameter. Since requirement for the strength of the moving members is not severe, the design of the water hammer preventing check valve is relatively easy and the water hammer preventing check valve can economically be manufactured. The timing when the valve element is to be seated on the valve seat can simply be adjusted, the adjustment of the water hammer preventing check valve at the installation of the same, and the maintenance and management of the water hammer preventing check valve are facilitated. Thus, the present invention attains remarkable effects unparalleled by the prior art.

We claim:

1. A water hammer preventing check valve comprising: a valve casing (1); a valve seat (3) disposed within the casing (1) at an inclination to streamlines of a fluid flowing through a passage in the casing (1); and a monoplane valve element (4) supported for swing motion within the valve casing (1) so as to be open to discharge the fluid while a pump is in operation and to be closed to check the reverse flow of the fluid on the discharge side when the pump stops; wherein the valve element (4) is always urged to swing in a valve closing direction, is formed in a shape which exerts a low form drag and a low inertial resistance, and is constructed so as to be substantially seated on the valve seat (3) at a moment when the inertial flow of the fluid in a discharge direction stops; a braking device (13) is attached to an upper portion of the valve casing (1); the valve element (4) is connected at a position on its back surface on the discharge side to a linear motion transmitting mechanism through a linking mechanism which does not transmit any motion while the valve element (4) is in a moving range other than a limited moving range between a position where the valve element (4) is almost seated on the valve seat (3) and a position where the valve element (4) is seated on the valve seat (3); the linear motion transmitting mechanism is connected to the braking device (13) so that the braking device (13) does not decelerate the valve closing motion until the valve element (4) in the valve closing motion reaches the position where the valve element (4) is almost seated on the valve seat (3), and the braking device (13) exerts a pulling force on the valve element (4) only while the valve element (4) moves in the limited moving range between the position where the valve element (4) is almost seated on the valve seat (3) and the position where the valve element (4) is seated on the valve seat (3).

2. A water hammer preventing check valve comprising: a valve casing (1); a valve seat (3) disposed within the casing (1) at an inclination to streamlines of a fluid flowing through a passage in the casing (1); and a monoplane valve element (4) supported for swing motion within the valve casing (1) so as to be open to discharge the fluid while a pump is in operation and to be closed to check the reverse flow of the fluid on the discharge side when the pump stops; wherein the valve element (4) is always urged to swing in a valve closing direction, is formed in a shape which exerts a low form drag and a low inertial resistance, and is constructed so as to be substantially seated on the valve seat (3) at a moment when the inertial flow of the fluid in a discharge direction stops; a braking device (13) is attached to an upper portion of the valve casing (1); the valve element (4) is connected at a position on its back surface on the discharge side directly to the braking device (13) through a linear motion transmitting mechanism; the braking device (13) is constructed so as not to exercise any braking effect while the valve element (4) is in a moving range other than a limited moving range between a position where the valve element (4) is almost seated on the valve seat (3) and a position where the valve element (4) is seated on the valve seat (3); the valve element (4) is biased in a valve closing direction by a valve element biasing member (19) which exerts a valve element biasing force exceeding frictional resistances of moving members and sealing members associated with the braking device (13) in order that the valve element (4) is not decelerated during a valve closing motion by the braking device (13) until the valve element (4) reaches the position where the valve element (4) is almost seated on the valve seat (3) and the braking device (13) exerts a pulling force on the valve element (4) only while the valve element (4) moves in the valve closing direction in the limited moving range between the position where the valve element (4) is almost seated on the valve seat (3) and the position where the valve element (4) is seated on the valve seat (3).

3. The water hammer preventing check valve according to claim 1, wherein the timing of seating the valve element (4) on the valve seat (3) is adjusted by means of a braking action starting position adjusting mechanism (16), a bypass adjusting valve (18) combined with the braking device (13) or a biasing force adjusting mechanism (20) for adjusting the valve element biasing force of a valve element biasing member (19).

4. The water hammer preventing check valve according to claim 2, wherein the timing of seating the valve element (4) on the valve seat (3) is adjusted by means of a braking action starting position adjusting mechanism (16), a bypass adjusting valve (18) combined with the braking device (13) or a biasing force adjusting mechanism (20) for adjusting the valve element biasing force of a valve element biasing member (19).

* * * * *